United States Patent [19]
Ritter et al.

[11] Patent Number: 5,211,208
[45] Date of Patent: May 18, 1993

[54] DOUBLE-POINT WELDING MACHINE

[75] Inventors: Gerhard Ritter; Klaus Ritter; Rudolf Scherr; Josef Grabuschnig, all of Graz, Austria

[73] Assignee: EVG Entwicklungs-U.Vertwertungs-Gesellschaft m.b.H., Raaba, Austria

[21] Appl. No.: 776,397
[22] PCT Filed: Mar. 1, 1991
[86] PCT No.: PCT/AT91/00036
§ 371 Date: Nov. 18, 1991
§ 102(e) Date: Nov. 18, 1991
[87] PCT Pub. No.: WO91/15317
PCT Pub. Date: Oct. 17, 1991

[30] Foreign Application Priority Data

Mar. 30, 1990 [AT] Austria ................ A 743/90

[51] Int. Cl.$^5$ ................ B21F 27/10; B22K 9/12
[52] U.S. Cl. ................ 140/112; 219/56; 219/58
[58] Field of Search ................ 140/7, 112; 219/56, 219/58; 226/122, 160

[56] References Cited

U.S. PATENT DOCUMENTS

| | | |
|---|---|---|
| 1,811,585 | 6/1931 | Kane . |
| 3,497,659 | 2/1970 | Ritter et al. ................ 219/58 |
| 4,068,110 | 1/1978 | Larsson . |
| 4,221,951 | 9/1980 | Connolly ................ 219/56 |
| 4,360,724 | 11/1982 | Ritter et al. ................ 219/58 |
| 4,539,457 | 9/1985 | Pinger et al. ................ 219/58 |

FOREIGN PATENT DOCUMENTS 267292 12/1968 Austria .
267293 12/1968 Austria .
0073336 3/1983 European Pat. Off. .

*Primary Examiner*—Lowell A. Larson
*Assistant Examiner*—Thomas C. Schoeffler
*Attorney, Agent, or Firm*—Frishauf, Holtz, Goodman & Woodward

[57] ABSTRACT

Double-spot welding machine for producing wire grids (G), having welding lines ($S_1$, $S_2$) of top and bottom electrodes (2, 3), which welding lines ($S_1$, $S_2$) are arranged at a mutual distance apart in a longitudinal wire advance direction and run transversely to the longitudinal-wire advance direction. A cross-wire feed apparatus (9) feeds two cross wires ($Q_1$, $Q_2$) along two insertion lines ($E_1$, $E_2$) arranged in front of the welding lines ($S_1$, $S_2$) at their predetermined distance from one another. A cross-wire transfer apparatus (10) transfers the cross wires ($Q_1$, $Q_2$) from the insertion lines ($E_1$, $E_2$) into the welding lines ($S_1$, $S_2$). The longitudinal wires (L) are advanced to the welding lines ($S_1$, $S_2$) and the welded wire grid (G) is pushed out of the welding lines ($S_1$, $S_2$). A holding arrangement (15, 18) holds the cross wires ($Q_1$, $Q_2$) in interengaged position in recesses (13) on support arms (12) which are displaceable relative to the longitudinal wires (L) during the transfer from the insertion lines ($E_1$, $E_2$) into the welding lines ($S_1$, $S_2$). A control device (C) controls raising and lowering of one electrode row per welding line ($S_1$, $S_2$) in cycles, as well as feeding, transfer and advance devices for the longitudinal and cross wires, in synchronism, but not necessarily at the same speeds, or time intervals.

9 Claims, 1 Drawing Sheet

DOUBLE-POINT WELDING MACHINE

FIELD OF THE INVENTION

The invention relates to a double-spot welding machine for producing wire grids of longitudinal and cross wires crossing one another at right angles.

BACKGROUND

Grids and known which have welding lines of top and bottom electrodes, which welding lines are arranged at a predetermined mutual distance apart in the longitudinal-wire advance direction and run transversely to the longitudinal-wire advance direction. A feeding apparatus feeds two cross wires along two insertion lines running transversely to the longitudinal-wire advance direction and arranged in front of the welding lines at their predetermined distance from one another. A transfer apparatus transfers the cross wires from the insertion lines into the welding lines, this apparatus having a plurality of supporting arms which are fastened to a common supporting beam, are provided with recesses for the cross wires, which recesses are arranged at a distance between the insertion lines. The arms and can be moved cyclically forwards and backwards in the longitudinal-wire advance direction by means of the supporting beam. A control device controls an operation in which one electrode row; and a control device via which one electrode row per welding line can be raised and lowered in cycles and the feeding and transfer apparatuses can be actuated.

Austrian Patent Specification 267,292, assigned to the assignee of this application, discloses a grid-welding machine of this type in which two cross wires are fed along insertion lines arranged in front of the welding lines and are advanced together with the longitudinal wires into the welding lines by means of a transport apparatus. The transport apparatus has a plurality of transport rails which are fastened to a common supporting beam and are provided with pairs of hooks for receiving the cross wires and with pairs of hooks, likewise acting on the cross wires, for simultaneously pulling the welded grid out of the welding lines. The distances between the hooks of each pair correspond to the desired cross-wire spacing in the finished grid, as a result of which this spacing is maintained very accurately and in an exactly reproducible manner. It has been found that the cross wires are deformed by the hooks at a higher production rate and that, in addition, the advance mechanism which is inevitably of particularly robust construction for a high production rate cannot guarantee the required rapid sequence of movement on due to an elevated moment of inertia.

EP-A-0,073,336, wenzel, discloses an advancing apparatus for longitudinal wires which is arranged in front of the welding line and consists of one transport drum each arranged above and below the longitudinal wires or of a plurality of transport-roller pairs per longitudinal wire. A gripping device arranged behind the welding line as viewed in the longitudinal-wire advance direction permits the advance of the grid when the residual lengths of the longitudinal wires have left the advancing apparatus described above. To push in the cross wires, transport drums or transport-roller pairs are actuated in cycles via a stepping control program, this program being corrected by means of a measuring instrument monitoring the longitudinal-wire advance. The apparatus has the disadvantage that complicated measuring and control devices are required for the advance of the longitudinal wires in order to avoid uneven advance, caused by varying wear of the transport drums or transport-roller pairs, and thus grid geometry.

THE INVENTION

It is an object to provide a machine of the type specified at the beginning which, while utilizing the advantages of the two known apparatuses described, permits a higher production rate than these known apparatuses and at the same time avoids any risk of deformation of the cross wires. Briefly, the control device controls advancing the longitudinal wires to the welding lines, while the welded wire grid, can at the same time be pushed out of the welding lines. Thus, the speed of the approach movement of the supporting beam and the speed of the working cycle of the longitudinal-wire advance apparatus can be of different magnitude. The duration of the approach movement of the supporting beam is greater than the duration of the working cycle of the longitudinal-wire advance apparatus, and a clamping arrangement is provided with which the cross wires can be held in place in a positive-locking manner and so as to be displaceable relative to the longitudinal wires during the transfer from the insertion lines into the welding lines.

With this construction, a high production rate of the welding machine is obtained, since the transfer apparatus for the cross wires, which does not need to produce any advance of the welded grid, can be of a lighter design than hitherto, which enables it to be operated continuously and enables its rate of motion to be increased; at the same time, the cross wires are conveyed without mutual relative movement into the welding lines, where they can be accurately welded to the longitudinal wires. As a result, any risk of deformation of the cross wires before and after the welding to the cross wires is avoided.

In a preferred embodiment of the invention, the clamping arrangement has, on the side of the cross wires which is located opposite the supporting arms, a stop device for the cross wires. This stop device can have a plurality of stop rails which each extend in the gaps between the longitudinal wires from the cross-wire insertion line which is first in the longitudinal-wire advance direction up to at least the welding line which is second in the longitudinal-wire advance direction and are provided on their underside with a stop and sliding surface. Furthermore, the stop device conveniently has guides which are provided with a stop and sliding surface facing the cross wires and with a groove for receiving at least one longitudinal wire.

The longitudinal-wire advance apparatus is preferably equipped with a plurality of roller pairs, which can be driven together, per longitudinal wire and can be actuated via the control device in a working cycle differing from the cross-wire spacing determined by the mutual distance apart of the welding lines.

To initially hold the cross wires in position, a plurality of pressure fingers which can be pressed flexibly against the cross wires are arranged along the insertion lines of the cross wires.

DRAWINGS

An exemplary embodiment of the invention is described in more detail below with reference to the drawings, in which:

FIG. 1 schematically shows in plan view a welding machine according to the innovation;

FIG. 3 shows a stop and guide device of the welding machine in detail, and

FIG. 4 shows in the form of a speed-time diagram the working cycle of the advance apparatus for the longitudinal wires and the working cycle of the transfer apparatus for the cross wires.

DETAILED DESCRIPTION

Figure 2:
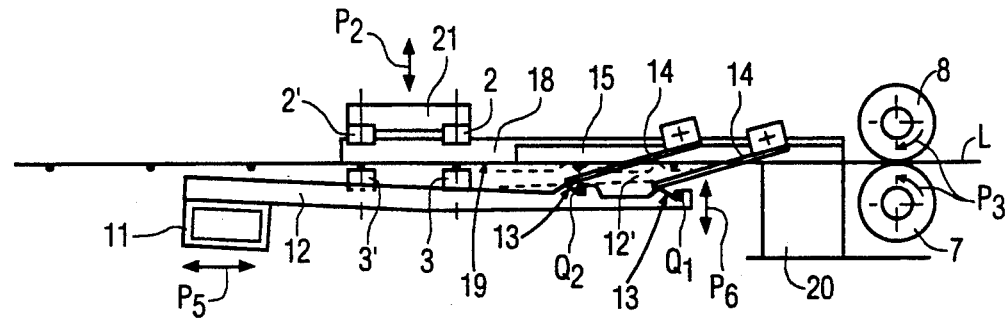
FIG. 2 shows a side view of the machine according to FIG. 1.
Figure 1:
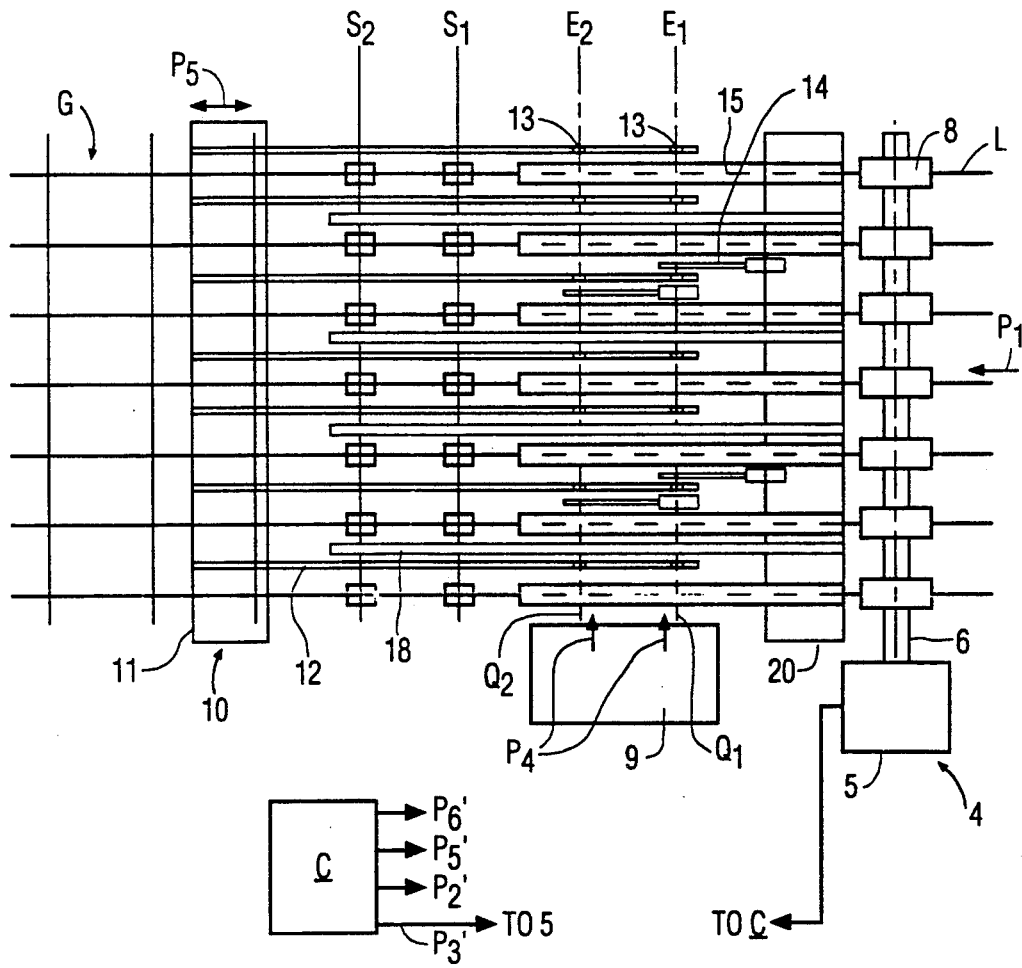

According to FIGS. 1 and 2, a group of longitudinal wires L is fed to the welding machine 1 in the direction of arrow $P_1$ (FIG. 1) by supply drums (not shown). The welding machine 1 works according to the double-spot welding method and is capable of welding two cross wires $Q_1$ and $Q_2$ to the group of longitudinal wires simultaneously.

Two rows of top electrodes 2, 2' and bottom electrodes 3, 3' are arranged above and respectively below the feed plane defined by the group of longitudinal wires along two welding lines $S_1$ and $S_2$ running transversely to the longitudinal-wire advance direction $P_1$ and arranged at a fixed distance from one another, in each case. The top electrodes 2 of the one row are connected to the top electrodes 2' of the other row in an electrically conductive manner by a current bridge 21 shown in FIG. 2, while the allocated bottom electrodes 3 and 3' respectively are connected to the terminals of a welding-current supply (not shown) The current bridge 21 and the top electrodes 2, 2' are raised and lowered in accordance with double arrow $P_2$ in the working cycle of the welding machine by means of welding cylinders (not shown) which can be actuated via a control device C, machine, a pair of cross wires is welded to a group of longitudinal wires. The distance between the two cross wires corresponds to the mutual distance $S_1 S_2$ of the welding lines $S_1$, $S_2$.

The longitudinal wires L are advanced into the welding lines $S_1$, $S_2$ and the finally welded grid G is pushed out of the welding lines $S_1$, $S_2$ by means of an advancing apparatus 4 which essentially has a shaft 6, which is arranged beneath the feed plane and can be driven by means of a drive device 5 in the direction of arrow $P_3$, as well as drive rollers 7 connected to this shaft 6 in such a way as to be fixed in terms of rotation, the number of which corresponds to the number of longitudinal wires, and mating rollers 8, pressed against these rollers, above the feed plane. As shown in FIG. 4, the drive rollers 7 are driven in cycles at a selectable speed and for a selectable duration via the control device C of the welding machine. The advance section which the longitudinal wires cover in the process during a working cycle is freely selectable and establishes a draw-spacing, that is the distances between the pairs of simultaneously welded cross wires. If the advance section corresponds to exactly twice the magnitude of the distance $\overline{S_1 S_2}$ between the pair of cross wires, the distances between the pairs of cross wires will be equal to the distance $\overline{S_1 S_2}$ so that a uniform cross-wire spacing in the grid results. In all other cases, the draw spacing will be less than or greater than this distance $\overline{S_1 S_2}$.

Cross wires $Q_1$ and $Q_2$ are fed laterally to the welding machine in the direction of arrow $P_4$ by means of a feeding apparatus 9 (only indicated schematically) which essentially has a straightening, advance and measuring device as well as shears The cross wires are fed via channels (not shown) along two insertion lines $E_1$, $E_2$ arranged at a fixed distance from one another and, as viewed in longitudinal-wire advance direction $P_1$, in front of the welding lines $S_1$, $S_2$. The mutual distance apart of the two insertion lines $E_1$, $E_2$ corresponds to the mutual distance apart of the welding lines $S_1$, $S_2$.

By means of a transfer apparatus 10, the cross wires $Q_1$, $Q_2$ are conveyed from the insertion lines $E_1$, $E_2$ into the welding lines $S_1$, $S_2$. The cross-wire transfer apparatus 10 has a pivotably mounted supporting beam 11 which can be moved continuously in a reciprocating manner in accordance with double arrow $P_5$ between a cross-wire receiving position and a cross-wire delivery position. As viewed in longitudinal-wire advance direction $P_1$, the supporting beam 11 lies behind the welding lines $S_1$, $S_2$ and extends over the entire width of the welding machine 1. The movement of the supporting beam 11 is produced by a drive device (not shown) and is controlled by the control device C of the welding machine. On its side facing the welding lines $S_1$, $S_2$, the supporting beam 11 is provided with a plurality of supporting arms 12 which project in the cross-wire receiving position into the insertion lines $E_1$, $E_2$ and which are each arranged between the longitudinal wires L and, on account of the displacement and pivoting movement of the supporting beam 11, perform a corresponding displacement movement in accordance with double arrow $P_5$ as well as a corresponding pivoting movement in accordance with double arrow $P_6$.

As shown in FIG. 2, the supporting arms 12 have at their free ends two recesses 13, the mutual distance apart of which corresponds to the mutual distance apart of the insertion lines $E_1$, $E_2$ and which are exactly in alignment with the insertion lines at the start of the working cycle of the cross-wire transfer apparatus 10. A plurality of pressure fingers 14 pressed flexibly against the cross wires are provided between the longitudinal wires L, which pressure fingers 14 hold the cross wires in the recesses 13 before the pivoting movement of the supporting arms 12.

The cross wires $Q_1$, $Q_2$ are transferred from the insertion lines $E_1$, $E_2$ into the welding lines $S_1$, $S_2$ in the following manner: the supporting arms 12 pivot with the cross wires $Q_1$, $Q_2$ out of the position shown by solid lines in FIG. 2 into the position 12' shown by broken lines and press the cross wires $Q_1$, $Q_2$ against guide rails 15. The guide rail or holding rails run in the advance direction, are provided with corresponding stop and sliding surfaces 16 (FIG. 3), made of wear-resistant material, and also grooves 17 (FIG. 3) for receiving an individual longitudinal wire or even for receiving a double wire formed of longitudinal wires lying close together, and extend up to the first welding line $S_1$. Arranged between the longitudinal wires L are further stop rails 18, on whose stop and sliding surface 19, made of wear-resistant material, the cross wires $Q_1$, $Q_2$ are guided. The stop rails 18 are fastened to a support 19 arranged transversely to the group of longitudinal wires and extend from the insertion line $E_1$ which is first in the longitudinal-wire advance direction beyond the second welding line $S_2$. In addition, the guide rails 15 are fastened to the support 19.

The cross wires $Q_1$, $Q_2$ are then transported by means of the supporting arms 12 in accordance with double arrow $P_5$ into the welding lines $S_1$, $S_2$, in the course of which the cross wires are held in a positive-locking manner between the recesses 13 of the supporting arms 12 on the one hand and the stop and sliding surfaces 16 and respectively on the other hand and slide along these stop and sliding surfaces.

In FIG. 4, an example of the curve of the advance speed v(R) of the longitudinal-wire advance apparatus 4 during a working cycle and of the curve of the approach speed $v_1$ (T) and the return speed $v_2$ (T) of the cross-wire transfer apparatus 10 during a working cycle are in each case shown in the form of a speed-time diagram. Here, the end of the approach movement of the cross-wire transfer apparatus 10 is designated by $t_1$ (T) and the end of the return movement is designated by $t_2$ (T). The approach speed $v_1$ (T) and the return speed $v_2$ (T) of the supporting beam 11 and the supporting arms 12 are conveniently the same and, for example in the case of a crank drive as a drive mechanism for the cross-wire transfer apparatus 10, have an approximately sinusoidal curve.

As can be gathered from FIG. 4, the duration t(R) of the actuation of the longitudinal-wire advance apparatus 4 is less than the duration $t_1$ (T) of the approach movement of the cross-wire transfer apparatus 10, so that a relative movement between the longitudinal and cross wires results. Furthermore, the advance speed v(R) of the longitudinal-wire advance apparatus 4 is different from the approach speed $v_1$(T) of the cross-wire transfer apparatus 10. Slipping of the cross wires $Q_1$, $Q_2$, which is caused by this relative movement, out of the recesses 13 of the transport arms 12 during the advance movement is prevented by the positive-locking clamping of the cross wires $Q_1$, $Q_2$ between the recesses 13 and the guide rails 15 as well as the stop rails 18. After the supporting arms 12 have conveyed the cross wires $Q_1$, $Q_2$ into the welding lines $S_1$, $S_2$, where the cross wires $Q_:$, $Q_2$ are welded to the longitudinal wires L by the electrodes 2, 2' and 3, 3' respectively, the supporting arms 12 are lowered by pivoting the supporting beam 11 in accordance with double arrow Ps and are moved back into the cross-wire receiving position by displacing the supporting beam 11 in accordance with double arrow $P_5$, as a result of which the recesses 13 again pass into the insertion lines $E_1$, $E_2$, where they can receive further cross wires. As already mentioned, the movement takes place continuously.

The exemplary embodiment described can be variously modified within the scope of the general idea behind the invention. Thus, for example, more than two recesses 13 for receiving cross wires can be formed on the transport arms 12 if the insertion lines, i.e. the insertion channels for the cross wires, and the welding lines, i.e. the electrode rows, are adjustable with regard to their mutual distance apart in the longitudinal-wire advance direction in order to make possible different distances and $\overline{E_1 E_2}$ and $\overline{S_1 S_2}$ respectively.

We claim:

1. Double-spot welding machine for producing wire grids formed of longitudinal wires (L) and cross wires ($Q_1$, $Q_2$), crossing each other at right angles, having
   a welding apparatus including
   two top electrode and bottom electrode pairs (2, 3; 2', 3') the top and bottom electrode pairs defining welding lines ($S_1$, $S_2$) which are spaced from each other by a predetermined distance in the direction of the longitudinal wires (L) and extend transversely to said direction,
   wherein one electrode (2, 2') of the pair is movable ($P_2$) relative to the other (3, 3');
   a longitudinal wire feeding means (5, 6, 7, 8) for feeding a plurality of longitudinal wires (L) in a feeding direction longitudinally of the extent of the longitudinal wires;
   a cross-wire feeding means (9) for feeding two cross-wires in a direction transversely to said longitudinal direction and defining two insertion lines ($E_1$, $E_2$) spaced by a defined distance from each other, said insertion lines being located, with respect to said longitudinal wire feeding direction, in advance of the welding lines ($S_1$, $S_2$);
   a cross-wire transfer apparatus (10) for transferring the cross-wires from the insertion line ($E_1$, $E_2$) to the welding line ($S_1$, $S_2$) including
   a common support beam (11);
   a plurality of cross-wire support arms (12) supported on said common support beam (11), said cross-wire support arms (12) being formed with recesses (13) spaced by said defined distance for reception of the cross wires ($Q_1$, $Q_2$);
   said common support beam (11) being movable cyclically ($P_5$) backwardly and forwardly in said longitudinal direction;
   a control device (C) controlling movement ($P_2$) of one electrode of each pair with respect to the other,
   further controlling feeding movement ($P_3$) of the longitudinal wire feeding means, and
   further controlling cyclical movement ($P_5$) of said support beam (11);
   and wherein said movement of the longitudinal wire feeding means (5, 6, 7, 8), under control of said control device (C), places the longitudinal wires (L) in position at the welding lines and simultaneously pushes welded grid out of position from the welding lines;
   said control device further controlling duration of movement as well as speed of movement ($v_1$(T)) of the support beam (11) and duration of feeding movement as well as speed of feeding movement (v(R)) of the longitudinal wire feeding means,
   wherein the speed of movement ($v_1$(T)) of the support beam and the speed of feeding movement (v(R)) of the longitudinal wire feeding means are individually selectable, and
   the duration of movement of the support beam (t(T)) is longer than the duration of feeding movement (t(R)) of the longitudinal wire feeding means; and
   wherein holding means (15, 18) are provided for engaging the cross-wires ($Q_1$, $Q_2$) during transfer from the insertion lines ($E_1$, $E_2$) to the welding lines ($S_1$, $S_2$) and holding said cross-wires in said recesses (13) of the support arms (12) upon movement of the cross-wire support arms (12) secured to the common support beam (11).

2. The welding machine of claim 1, wherein said support arms (12) are located on a first side of the cross-wires ($Q_1$, $Q_2$) and said holding means (15, 18) are located on a second side of said cross-wires opposite said first side.

3. The welding machine of claim 2, wherein said holding means comprises guide rails (15) positioned to engage at least one longitudinal wire (L).

4. The welding machine of claim 1, wherein said holding means comprises a plurality of engagement rails (18), positioned in gaps between the longitudinal wires (L) and extending at least to the welding lines ($S_2$) most remote from the longitudinal wire feeding means, said rails being formed with a wear-resistant engagement and sliding surface (19).

5. The welding machine of claim 4, wherein said rails (15) are formed with a groove (17) for receiving at least one longitudinal wire.

6. The welding machine of claim 1, wherein said longitudinal wire feeding means comprises a pair of roller means (7, 8) located at respectively opposite sides of the plurality of longitudinal wires.

7. The welding machine of claim 6, wherein said roller means comprises a plurality of roller pairs, one each for each longitudinal wire, and a common drive means (5, 6) for at least one of the rollers of the roller pairs.

8. The welding machine of claim 1, wherein the speed of feeding movement ($v(R)$) and the duration ($t(R)$) of feeding movement of the longitudinal wire feeding means is adjustable, by said control device (C), in dependence on a desired spacing of the cross wires on the grid, and said predetermined distance between said welding lines ($S_1$, $S_2$).

9. The welding machine of claim 1, further including a plurality of pressure fingers (14) arranged for engaging the cross-wires ($Q_1$, $Q_2$) at the insertion lines ($E_1$, $E_2$) in the recesses (13) of the support arms (12).

* * * * *